July 9, 1929.  R. DE L. ALBRIGHT  1,719,865
LIQUID SOAP DISPENSER
Filed Aug. 25, 1928
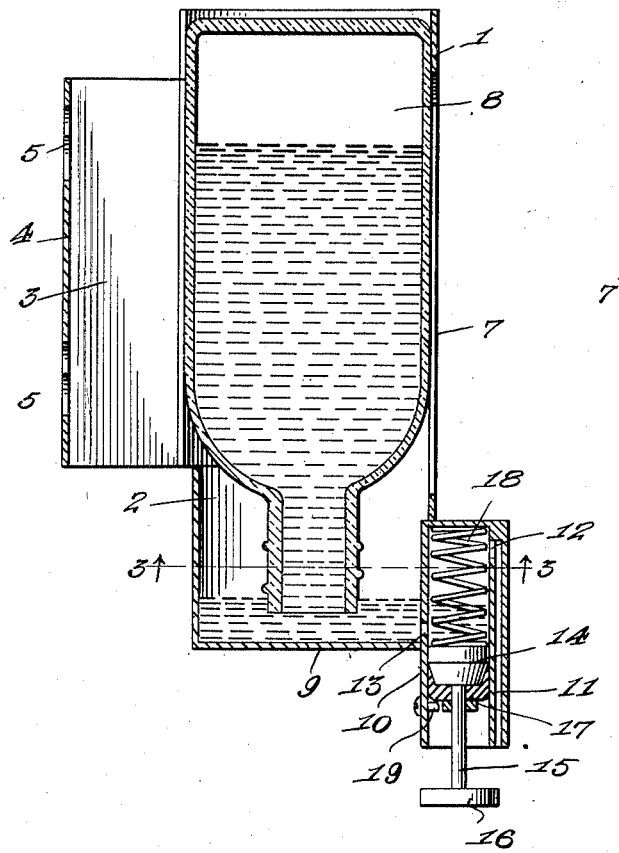
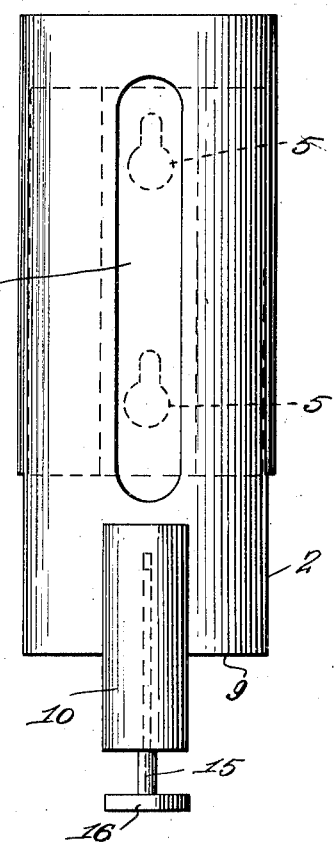
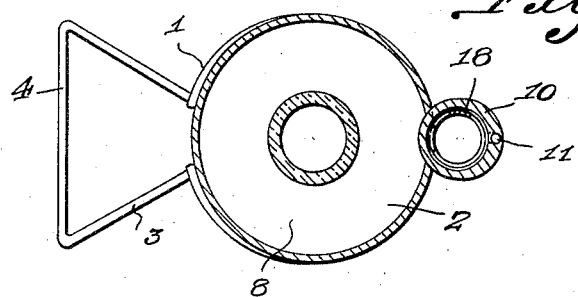
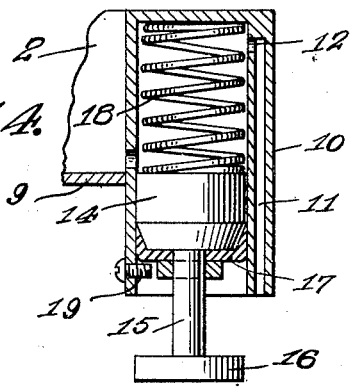
Ralph DeLos Albright,
INVENTOR
BY Victor J. Evans
ATTORNEY Patented July 9, 1929.

1,719,865

UNITED STATES PATENT OFFICE.

RALPH DE LOS ALBRIGHT, OF PITTSBURGH, PENNSYLVANIA, ASSIGNOR OF ONE-HALF TO CHARLES K. SZALKAY, OF PITTSBURGH, PENNSYLVANIA.

LIQUID-SOAP DISPENSER.

Application filed August 25, 1928. Serial No. 302,037.

My present invention has reference to a dispensing device for receptacles containing liquid soap or like liquids to be dispensed from the receptacle in small quantities.

The primary object is the provision of means whereby the dispensing apparatus will deliver only a small predetermined quantity of liquid upon each operation thereof.

A further object is the provision of a dispensing device which shall be of an extremely simple construction and which by the mere pressure of the handle of the plunger will eject a predetermined quantity of liquid onto the hand of the operator.

To the attainment of the foregoing, the invention consists in the improvement hereinafter described and definitely claimed.

In the drawings:

Figure 1 is an approximately central vertical longitudinal sectional view through the improvement.

Figure 2 is a front elevation thereof.

Figure 3 is a horizontal sectional view approximately on the line 3—3 of Figure 1.

Figure 4 is an enlarged detail longitudinal sectional view through the liquid receiving and dispensing chamber.

In carrying out my invention I make use of a cylindrical body 1 open at its top and closed at its bottom. In the showing of the drawings the casing 1 is integrally formed at its bottom with a partially closed compartment 2 and above the compartment the casing is slit longitudinally and from the edges provided by these slits the casing is bent at outward angles, as at 3, and the said angle sides are connected by a plate 4. The plate is provided with a pair of spaced key-hole slots 5 designed for the reception of nails or like headed elements whereby the casing is supported in a vertical position.

Preferably the front of the casing is provided with a longitudinally arranged sight opening 7 and the casing is designed to have inserted from its open top an inverted liquid soap containing bottle 8. By providing the casing proper in the nature of a split member the same will frictionally engage with the bottle so that the mouth of the bottle may be arranged at any desired distance above the closed bottom 9 of the compartment 2. Also by providing the casing with a rear slit and the sight opening 7 the bottle may be readily removed from the casing when the contents thereof are dispensed.

Fixedly secured to the outer face, adjacent to the lower end of the casing 1 there is a cylindrical receptacle 10. This receptacle extends a suitable distance above the closed bottom 9 and likewise a suitable distance below such bottom. The top of the cylindrical receptacle 10 is closed, and the outer wall thereof is preferably thickened and formed from a point adjacent the said closed top with a passage 11, the said passage having an angle port 12 which communicates with the receptacle. The inner wall of the receptacle 10 is provided with an opening 13 which communicates with the compartment 2 adjacent the bottom thereof. In the cylindrical receptacle 10 there is a plunger 14. This plunger has a depending stem 15 which is headed, as at 16, the headed end of the stem projecting a suitable distance below the open mouth of the receptacle. On the under face of the plunger and likewise on the stem 16 therefore, there is fixed a cup washer 17 to insure a frictional contact with the bore of the receptacle 10. The receptacle is influenced in a downward direction to uncover the port or passage 13 by a spring 18 and is limited in such downward movement by a stop element 19.

With the improvement it is merely necessary for the operator to press his hand against the head 16 of the plunger, to cause the latter with its washer or gasket 17 to forcibly eject the liquid from the bottle 8 that is received through the receptacle 10 through the outlet passage for the said receptacle. This liquid will be delivered onto the palm of the hand of the operator. The quantity of liquid received in the receptacle is regulated by the adjustment of the bottle in the casing 1.

The simplicity of the construction and the advantages thereof will, it is thought, be understood and appreciated by those skilled in the art to which such invention relates but obviously I do not wish to be limited to the precise details herein set forth and, therefore, hold myself entitled to make such changes therefrom as fairly fall within the scope of what I claim.

Having described the invention, I claim:

1. A liquid dispensing apparatus, comprising a casing having a closed bottom and which casing is designed to receive therein an inverted liquid containing bottle, a receptacle having an open bottom, said receptacle being fixed on one side of the casing and projecting beyond the closed bottom of said casing and having its outer wall formed with a vertical passage communicating with its open bottom, and having an upper port establishing a communication between the passage and the receptacle, said receptacle having a lower port communicating with the bottom of the casing, a spring influenced plunger in the casing normally uncovering the lower port, stop means for limiting the outward movement of the plunger and a headed operating stem for the plunger.

2. A liquid soap dispensing apparatus, comprising a split casing having an open top, and a closed compartment at the bottom thereof, angularly extending sides in a line with the edges of the split casing, a plate connecting said sides having key hole openings therethrough, said casing having a sight opening on its opposite face, a cylindrical receptacle having a port communicating with the compartment and depending therebelow, said receptacle having a closed top and an open bottom and having its outer wall thickened and provided with a longitudinal passage which terminates adjacent its closed top and which has an upper port at the terminal of its passage that establishes a communication with the receptacle, a spring influenced plunger in the receptacle normally uncovering the port in the compartment, a compressible gasket for the plunger, a removable stop element for limiting the outward movement of the plunger, and a headed operating stem for the plunger.

In testimony whereof I affix my signature.

RALPH DE LOS ALBRIGHT.